(12) United States Patent
Shin (10) Patent No.: US 8,196,978 B2
(45) Date of Patent: Jun. 12, 2012

(54) CARRIER AND FRONT END MODULE SYSTEM

(75) Inventor: Hee Sun Shin, Hwaseong-si (KR)

(73) Assignee: Hyundai Motor Company, Seoul (KR)

( * ) Notice: Subject to any disclaimer, the term of this patent is extended or adjusted under 35 U.S.C. 154(b) by 337 days.

(21) Appl. No.: 12/205,189

(22) Filed: Sep. 5, 2008

(65) Prior Publication Data

US 2009/0261601 A1 Oct. 22, 2009

(30) Foreign Application Priority Data

Apr. 18, 2008 (KR) ........................ 10-2008-0036218

(51) Int. Cl.
*B60R 19/24* (2006.01)
*B60R 19/03* (2006.01)

(52) U.S. Cl. .................. 293/115; 296/193.1; 180/68.6

(58) Field of Classification Search .................. 293/115, 293/117; 180/68.6, 68.3; 296/193.09, 193.1, 296/194, 187.09, 203.02
See application file for complete search history.

(56) References Cited

U.S. PATENT DOCUMENTS

| | | | | |
|---|---|---|---|---|
| 4,466,646 A * | 8/1984 | Delmastro et al. | ............ | 293/117 |
| 4,566,407 A * | 1/1986 | Peter | ........................ | 123/41.48 |
| 5,348,114 A * | 9/1994 | Yamauchi | .................... | 180/291 |
| 5,533,780 A * | 7/1996 | Larson et al. | ............ | 296/203.02 |
| 5,658,041 A * | 8/1997 | Girardot et al. | .......... | 296/193.09 |
| 6,186,583 B1 * | 2/2001 | Martin | .................... | 296/193.09 |
| 6,189,958 B1 * | 2/2001 | Guyomard et al. | ...... | 296/193.09 |
| 6,196,624 B1 * | 3/2001 | Bierjon et al. | .......... | 296/193.09 |
| 6,273,496 B1 * | 8/2001 | Guyomard et al. | ...... | 296/193.09 |
| 6,293,615 B1 * | 9/2001 | Tarahomi | ................ | 296/193.09 |
| 6,357,821 B1 * | 3/2002 | Maj et al. | ................ | 296/193.09 |
| 6,412,855 B1 * | 7/2002 | Cantineau et al. | ....... | 296/187.01 |
| 6,464,289 B2 * | 10/2002 | Sigonneau et al. | ...... | 296/193.09 |
| 6,502,653 B1 * | 1/2003 | Balzer et al. | ................ | 180/68.4 |
| 6,508,506 B2 * | 1/2003 | Ozawa et al. | ............ | 296/203.02 |
| 6,516,906 B2 * | 2/2003 | Sasano et al. | ................ | 180/68.4 |
| 6,523,886 B2 * | 2/2003 | Hoffner et al. | ........... | 296/203.02 |
| 6,547,317 B1 * | 4/2003 | Cheron et al. | ........... | 296/193.01 |
| 6,619,419 B1 * | 9/2003 | Cheron et al. | ................ | 180/311 |
| 6,626,483 B2 * | 9/2003 | Ozawa et al. | ............ | 296/193.09 |
| 6,634,702 B1 * | 10/2003 | Pleschke et al. | ......... | 296/187.04 |
| 6,648,399 B2 * | 11/2003 | Ozawa et al. | ............ | 296/193.09 |
| 6,679,545 B1 * | 1/2004 | Balzer et al. | ............. | 296/193.09 |
| 6,685,258 B2 * | 2/2004 | Brogly et al. | ............ | 296/203.02 |
| 6,715,573 B2 * | 4/2004 | Emori et al. | ................ | 180/68.4 |
| 6,729,681 B2 * | 5/2004 | Yustick | .................... | 296/193.01 |
| 6,796,604 B2 * | 9/2004 | Igura et al. | ............... | 296/193.03 |
| 6,869,131 B2 * | 3/2005 | Kafuku et al. | ........... | 296/187.09 |
| 6,874,843 B2 * | 4/2005 | Awano et al. | ........... | 296/203.02 |
| 6,877,797 B2 * | 4/2005 | Henderson et al. | ...... | 296/203.02 |

(Continued)

FOREIGN PATENT DOCUMENTS

JP 2000-326867 A 11/2000

(Continued)

*Primary Examiner* — Glenn Dayoan
*Assistant Examiner* — Pinel Romain
(74) *Attorney, Agent, or Firm* — Morgan, Lewis & Bockius LLP (57) ABSTRACT

A carrier for a front end module as a front structure of a vehicle, and a front end module system, comprises a sub frame formed to extend horizontally across an opening of a quadrangular main frame in which a radiator is to be arranged, and air guides are formed on the main frame and the sub frame to project forward.

9 Claims, 8 Drawing Sheets

U.S. PATENT DOCUMENTS

| | | | |
|---|---|---|---|
| 6,880,882 B2 * | 4/2005 | Andre et al. | 296/193.09 |
| 6,886,886 B2 * | 5/2005 | Seksaria et al. | 296/193.09 |
| 6,893,081 B2 * | 5/2005 | Sasano et al. | 296/203.02 |
| 6,955,393 B2 * | 10/2005 | Staargaard et al. | 296/193.1 |
| 6,979,053 B2 * | 12/2005 | Kim | 296/193.09 |
| 7,014,257 B2 * | 3/2006 | Lazzeroni et al. | 296/203.02 |
| 7,073,848 B2 * | 7/2006 | Lee | 296/193.09 |
| 7,114,587 B2 * | 10/2006 | Mori et al. | 180/68.3 |
| 7,290,630 B2 * | 11/2007 | Maeda et al. | 180/68.4 |
| 7,377,579 B2 * | 5/2008 | Kwon | 296/193.09 |
| 7,416,241 B2 * | 8/2008 | Wallman et al. | 296/187.03 |
| 7,451,844 B2 * | 11/2008 | Kunikata | 180/68.1 |
| 7,461,890 B2 * | 12/2008 | Yatsuda | 296/203.02 |
| 7,571,957 B2 * | 8/2009 | Povinelli et al. | 296/193.09 |
| 2001/0010275 A1 * | 8/2001 | Sasano et al. | 180/68.1 |
| 2001/0011614 A1 * | 8/2001 | Sasano et al. | 180/68.1 |
| 2002/0043820 A1 * | 4/2002 | Brogly et al. | 296/203.02 |
| 2003/0160477 A1 * | 8/2003 | Sasano et al. | 296/203.02 |
| 2004/0080183 A1 * | 4/2004 | Andre et al. | 296/193.04 |
| 2005/0029027 A1 * | 2/2005 | Kunikata et al. | 180/68.1 |
| 2005/0134093 A1 * | 6/2005 | Borkowski et al. | 296/203.02 |
| 2005/0218699 A1 * | 10/2005 | Andre et al. | 296/193.09 |
| 2006/0102109 A1 * | 5/2006 | Becker et al. | 123/41.48 |
| 2006/0156547 A1 * | 7/2006 | Tarahomi | 29/897.2 |
| 2006/0175873 A1 * | 8/2006 | Miyata et al. | 296/203.02 |
| 2006/0237999 A1 * | 10/2006 | Sasaki | 296/203.02 |
| 2007/0057534 A1 * | 3/2007 | Ziaja et al. | 296/193.01 |
| 2008/0185872 A1 * | 8/2008 | Povinelli et al. | 296/193.09 |
| 2008/0231084 A1 * | 9/2008 | Mishima | 296/203.02 |
| 2009/0140552 A1 * | 6/2009 | Kang | 296/193.09 |
| 2009/0212600 A1 * | 8/2009 | Fischer et al. | 296/193.09 |
| 2009/0273196 A1 * | 11/2009 | Ayabe et al. | 293/115 |

FOREIGN PATENT DOCUMENTS

| | | |
|---|---|---|
| JP | 2002-283938 | 10/2002 |
| JP | 2006-175987 A | 7/2006 |
| JP | 2007-245920 A | 9/2007 |
| KR | 10-2005-0061094 | 6/2005 |
| KR | 10-2005-0109775 A | 11/2005 |
| KR | 10-2005-0114490 | 12/2005 |
| KR | 10-2008-0027069 A | 3/2008 |

* cited by examiner

CARRIER AND FRONT END MODULE SYSTEM

CROSS-REFERENCE TO RELATED APPLICATIONS

This application claims priority to Korean Application No. 10-2008-0036218, filed on Apr. 18, 2008, the disclosure of which is incorporated herein by reference.

BACKGROUND OF THE INVENTION (1) Field of the Invention

The present invention relates to a carrier, and more particularly a carrier for a front end module as the front structure of a vehicle, and a front end module system including the carrier and a bumper cover assembly.

(2) Description of the Related Art

Recently, in a vehicle, the use of a front end module, in which the front component parts of the vehicle, such as head lamps, a bumper beam and a radiator, are mounted to a carrier to constitute a modular structure so as to improve workability, is gaining popularity.

Figure 1A:
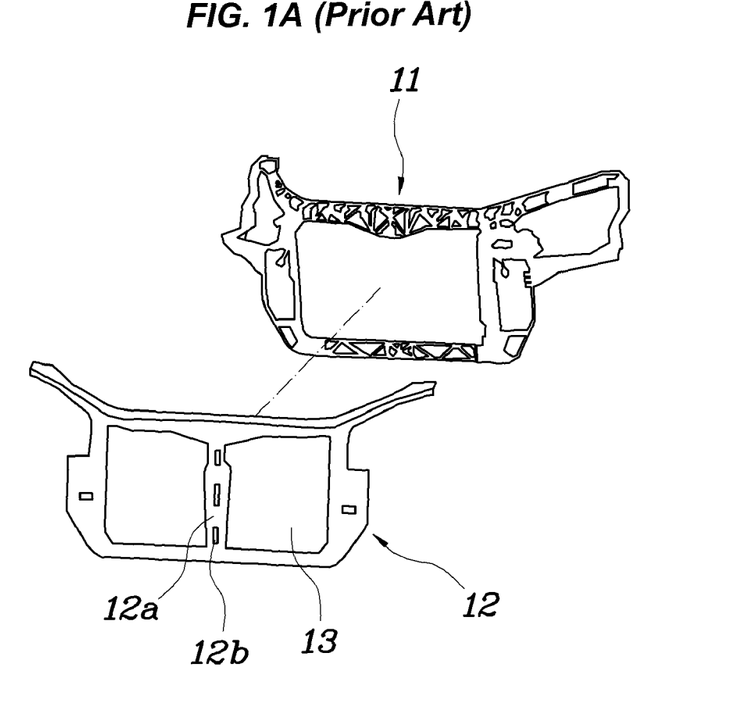
FIG. 1A is an exploded view illustrating a steel carrier and a plastic carrier, which constitute a conventional carrier for a front end module.
Figure 1B:
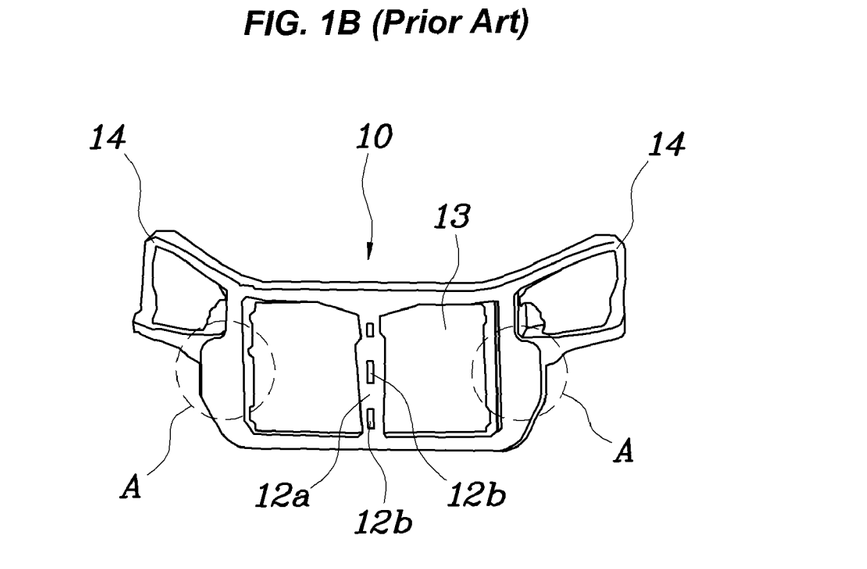
FIG. 1B is a view illustrating the carrier which is obtained by insert-injection molding the steel carrier and the plastic carrier shown in FIG. 1A.

Referring to FIGS. 1A and 1B, a conventional carrier 10 for a front end module is manufactured by separately forming a plastic carrier 11 and a steel carrier 12 and then insert-injection molding them together. In general, the steel carrier 12 has a sub frame 12a which extends vertically through the opening 13 defined in the steel carrier 12 to reinforce the strength of the steel carrier 12. Through-holes 12b are formed in the sub fame 12a to decrease the weight of the carrier 10 and permit various component parts to be mounted therein.

Figure 2:
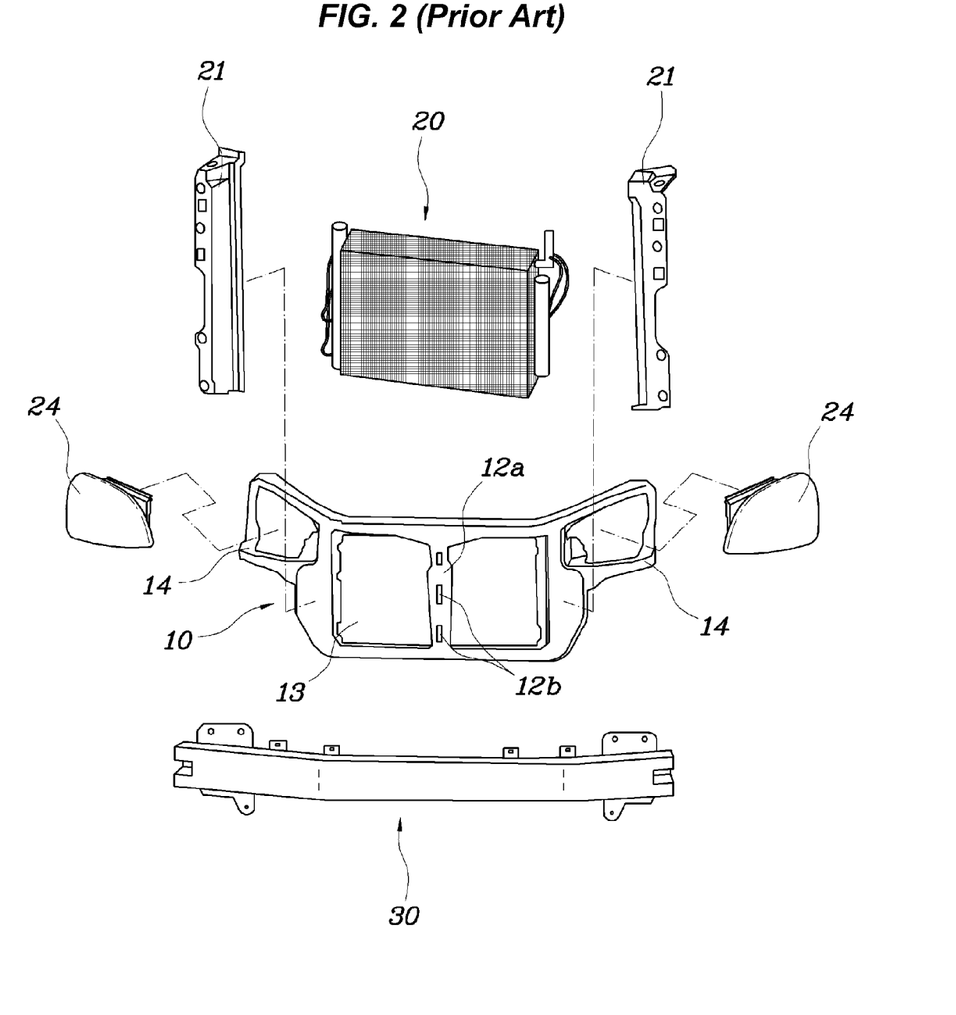
FIG. 2 is an exploded view illustrating a conventional front end module.

FIG. 2 is an exploded view of a conventional front end module. Referring to FIG. 2, a radiator 20 is arranged behind the opening 13 defined in the main frame of the carrier 10, and a bumper beam 30 is arranged in front of the carrier 10. Head lamps 24 are mounted to ear portions 14 which are formed on the upper portions of both sides of the carrier 10. Air guides 21 are arranged on portions of the main frame on which the left and right ends of the radiator 20 are positioned.

Figure 3A:
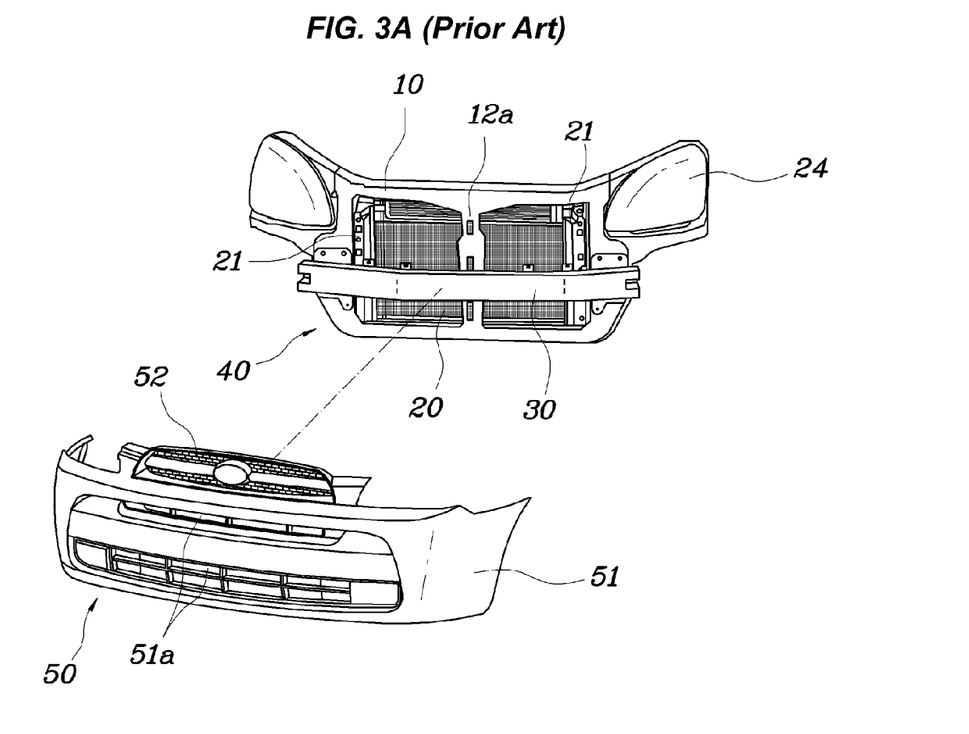
FIG. 3A and FIG. 3B are views illustrating a conventional front end module system.
Figure 3B:
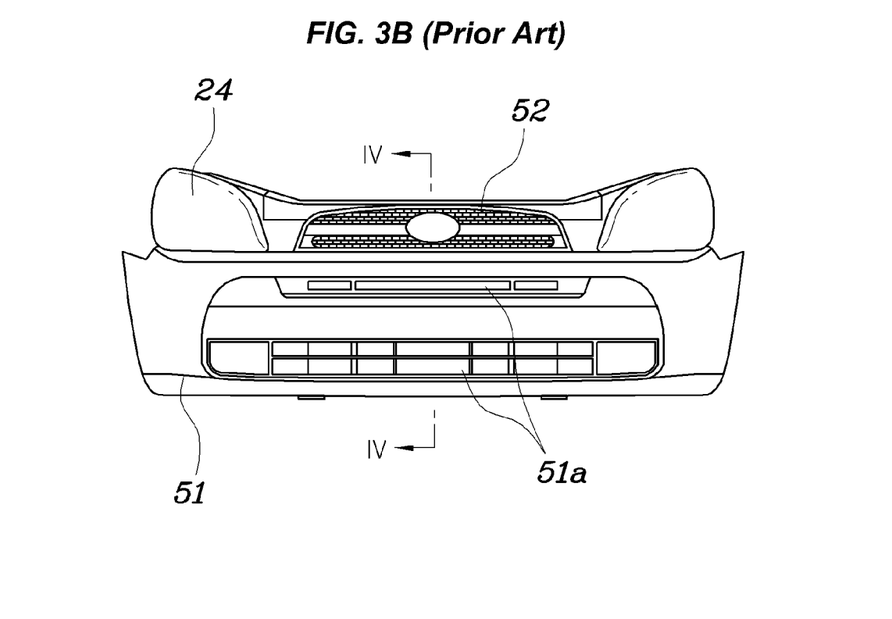

Referring to FIG. 3A and FIG. 3B, the above-described front end module, designated by the reference numeral 40, constitutes a front end module system (as shown in FIG. 3B) together with a bumper cover assembly 50, which is disposed in front of the front end module 40. The bumper cover assembly 50 includes a bumper cover 51, which has air inlets 51a, and a bumper grill 52, which is disposed behind the bumper cover 51 to improve the appearance of the air inlets 51a The air guides 21 installed on the carrier 10 guide the air introduced through the air inlets 51a of the bumper cover 51 and the bumper grill 52 so that it does not flow outside but is directed toward the radiator 20.

Figure 4:
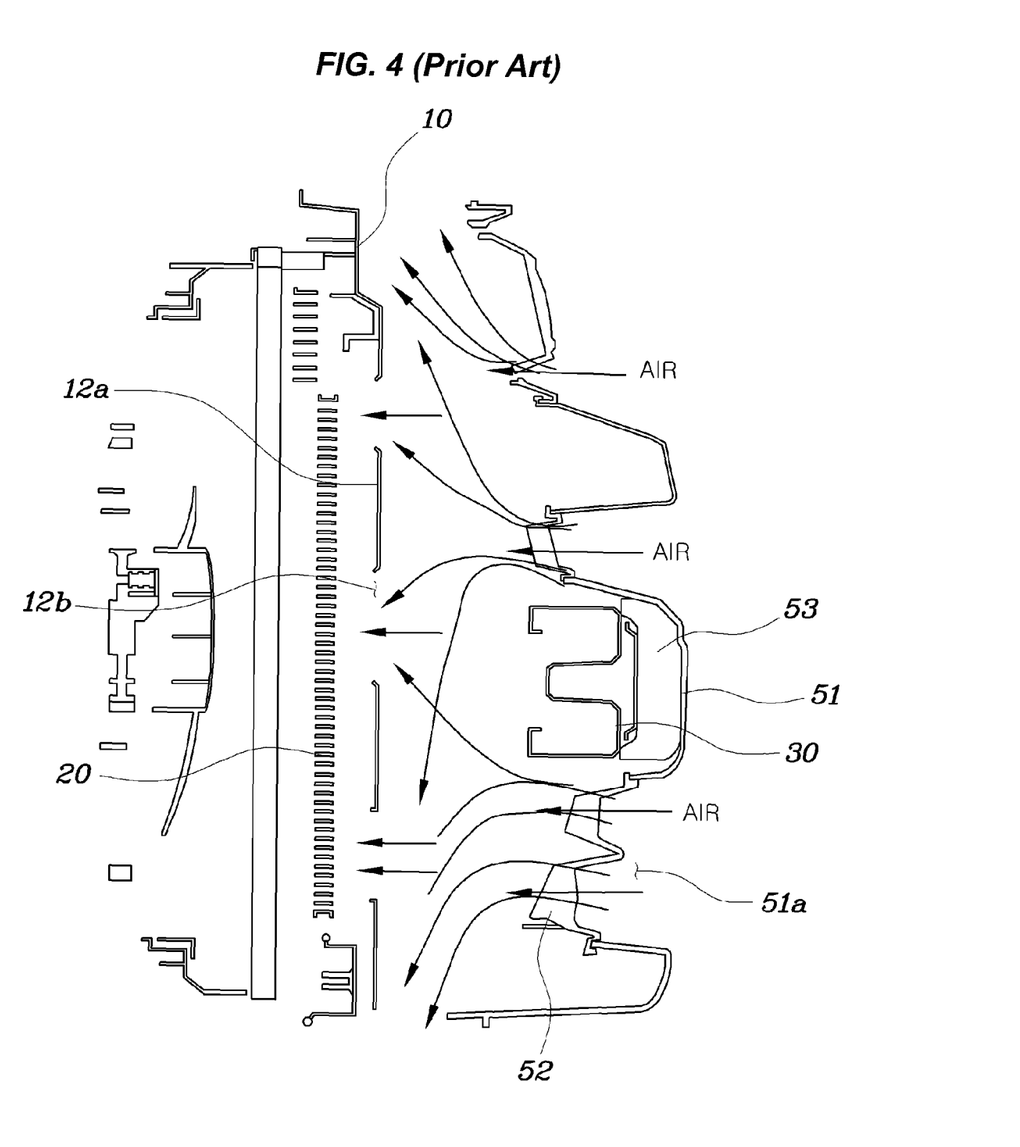
FIG. 4 is a sectional view taken along the line IV-IV of FIG. 3B.

The conventional carrier 10 for a front end module has the following problems. Referring to FIG. 4 of a sectional view taken along the line IV-IV of FIG. 3B, in areas where the air guides 21 are not installed, most of the air introduced through the air inlets 51a and the bumper grill 52 is not directed toward the radiator 20, but flows to the outside. This means that the conventional carrier 10 and the associated structure fail to efficiently guide air flow required for cooling the radiator 20. Considering the recent trend of decreasing the size of the air inlets 51a of the bumper cover 51 in order to improve the outer appearance thereof, measures for increasing the amount of air contributing to the cooling of the radiator 20 are in demand. The reference numeral 53 indicates an energy absorber.

Further, in the parts 'A' shown in FIG. 1, the junction area between the plastic carrier 11 and the steel carrier 12 has insufficient strength, and therefore, cracks are likely to form in the junction area in the event of even a slight rear-end collision. As a consequence, cracks may occur in the front end module even in the event of such a slight rear-end collision, and therefore, high repair costs can be incurred.

The information disclosed in this Background of the Invention section is only for enhancement of understanding of the background of the invention and should not be taken as an acknowledgement or any form of suggestion that this information forms the prior art that is already known to a person skilled in the art.

SUMMARY OF THE INVENTION

Accordingly, embodiments of the present invention has been made keeping in mind the above problems occurring in the prior art, and an object of the present invention is to provide a carrier which guides air to be smoothly introduced toward a radiator from the front part of a vehicle, thereby improving the cooling performance of a radiator, and a front end module system having the same.

Another object of the present invention is to provide a carrier which has increased strength so that cracks do not occur due to insufficient strength at the junction area between a plastic carrier and a steel carrier in the event of a rear-end collision, and a front end module system having the same.

In order to achieve the above objects, according to one aspect of the present invention, there is provided a carrier for a front end module as a front structure of a vehicle, wherein a sub frame may be formed to extend horizontally across an opening of a quadrangular main frame in which a radiator is to be arranged under the sub frame, and air guides are formed on the main frame and the sub frame to project forward. The carrier may be manufactured by insert-injection molding a plastic carrier and a steel carrier, which are formed separately from each other. The air guides may be formed on the plastic carrier. The sub frame and the main frame, to which both ends of the sub frame may be connected, are formed on the plastic carrier.

In another exemplary embodiment of the present invention, a front end module system may comprise: a bumper cover assembly having air inlets; and a carrier having a sub frame which is formed to extend horizontally across an opening of a quadrangular main frame in which a radiator is to be arranged under the sub frame, and air guides which are formed on the main frame and the sub frame to project forward, wherein the bumper cover assembly is disposed in front of the carrier, and the air inlets of the bumper cover assembly are formed to communicate with respective portions of the opening which is divided by the sub frame. The bumper cover assembly may include a bumper beam, which is disposed side by side with the sub frame in front of the sub frame.

In further another exemplary embodiment of the present invention, a carrier for a front end module as a front structure of a vehicle may comprise: a first carrier including: a main frame having an opening; at least a sub frame protrusively formed to extend traversally across the opening of the main frame in which a radiator is to be arranged under the sub frame; and at least an air guide protrusively formed on the main frame, and a second carrier having a receiving opening wherein the main frame of the first carrier is assembled onto or around the receiving opening of the second carrier. The main frame may be in a quadrangular shape. The first carrier may be plastic. The second carrier may be steel. A bumper cover assembly may be disposed in front of the second carrier and coupled to the second carrier, and air inlets of the bumper cover assembly are formed to communicate with respective portions of the opening which is divided by the at least a sub frame. The bumper cover assembly may include a bumper beam, which is disposed side by side with the sub frame in front of the sub frame and coupled to the second carrier. Air inlets of the bumper cover assembly may be disposed side by side with the respective openings of the main frame which is divided by the sub frame.

In another exemplary embodiment of the present invention, the at least an air guide may be protrusively formed around the opening on the main frame of the first carrier. A bumper cover assembly may be disposed in front of the second carrier and coupled to the second carrier, and air inlets of the bumper cover assembly may be formed to communicate with respective portions of the opening of the main frame which is divided by the at least a sub frame. The bumper cover assembly may include a bumper beam, which is disposed side by side with the sub frame in front of the sub fame and coupled to the second carrier. Air inlets of the bumper cover assembly may be disposed side by side with the respective openings which are divided by the sub frame.

BRIEF DESCRIPTION OF THE DRAWINGS

The above and other features of the present invention will now be described in detail with reference to certain exemplary embodiments thereof illustrated the accompanying drawings which are given hereinbelow by way of illustration, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF A PREFERRED EMBODIMENT

Reference will now be made in detail to a preferred embodiment of the present invention, an example of which is illustrated in the accompanying drawings and described below. While the invention will be described in conjunction with an exemplary embodiment it should be understood that the description is not intended to limit the invention to the exemplary embodiment. On the contrary, the invention is intended to cover not only the exemplary embodiment, but also various alternatives, modifications, equivalents and other embodiments, which may be included within the spirit and scope of the invention as defined by the appended claims.

Figure 5A:
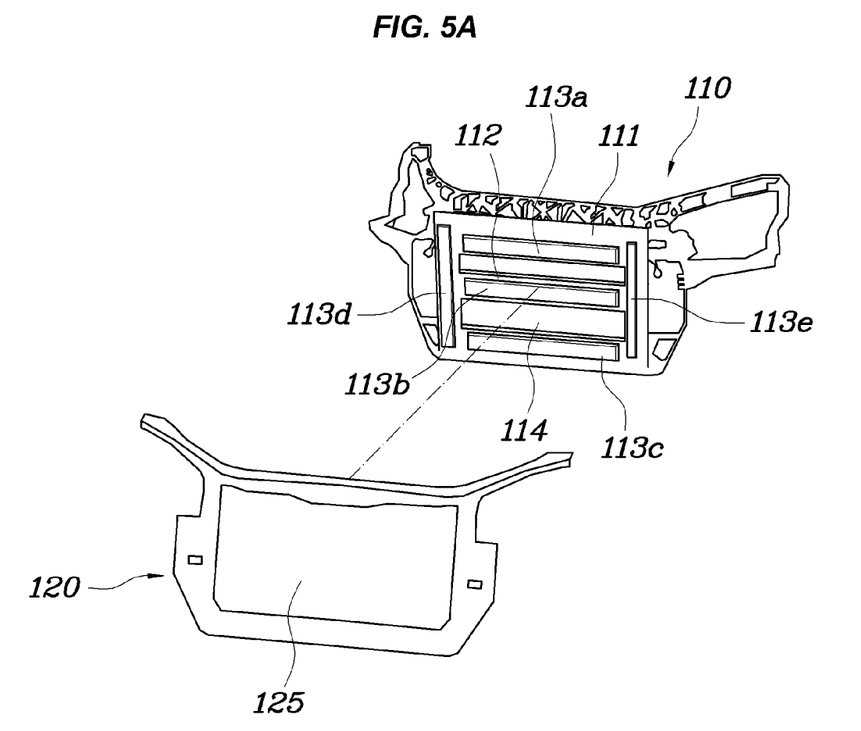
FIG. 5A is an exploded view illustrating a steel carrier and a plastic carrier which constitute a carrier for a front end module in accordance with an exemplary embodiment of the present invention.
Figure 5B:
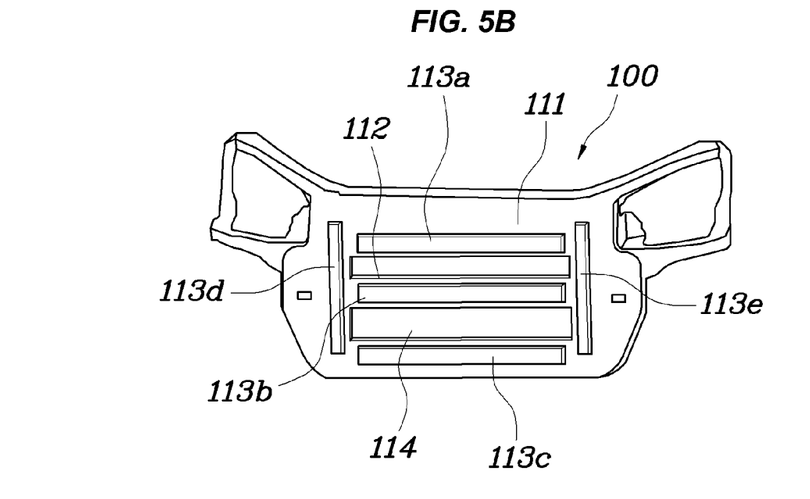
FIG. 5B is a view illustrating the carrier which is obtained by insert-injection molding the steel carrier and the plastic carrier shown in FIG. 5A.

Referring to FIGS. 5A and 5B, a carrier 100 for a front end module in accordance with an exemplary embodiment of the present invention is manufactured in a manner similar to that of the conventional art, by separately forming a plastic carrier 110 and a steel carrier 120 and then insert-injection molding them together. The vertically extending sub flame provided in the conventional steel carrier is omitted in the present invention, and instead, a reinforcing member is provided to the plastic carrier 110 as explained hereinafter.

Figure 8:
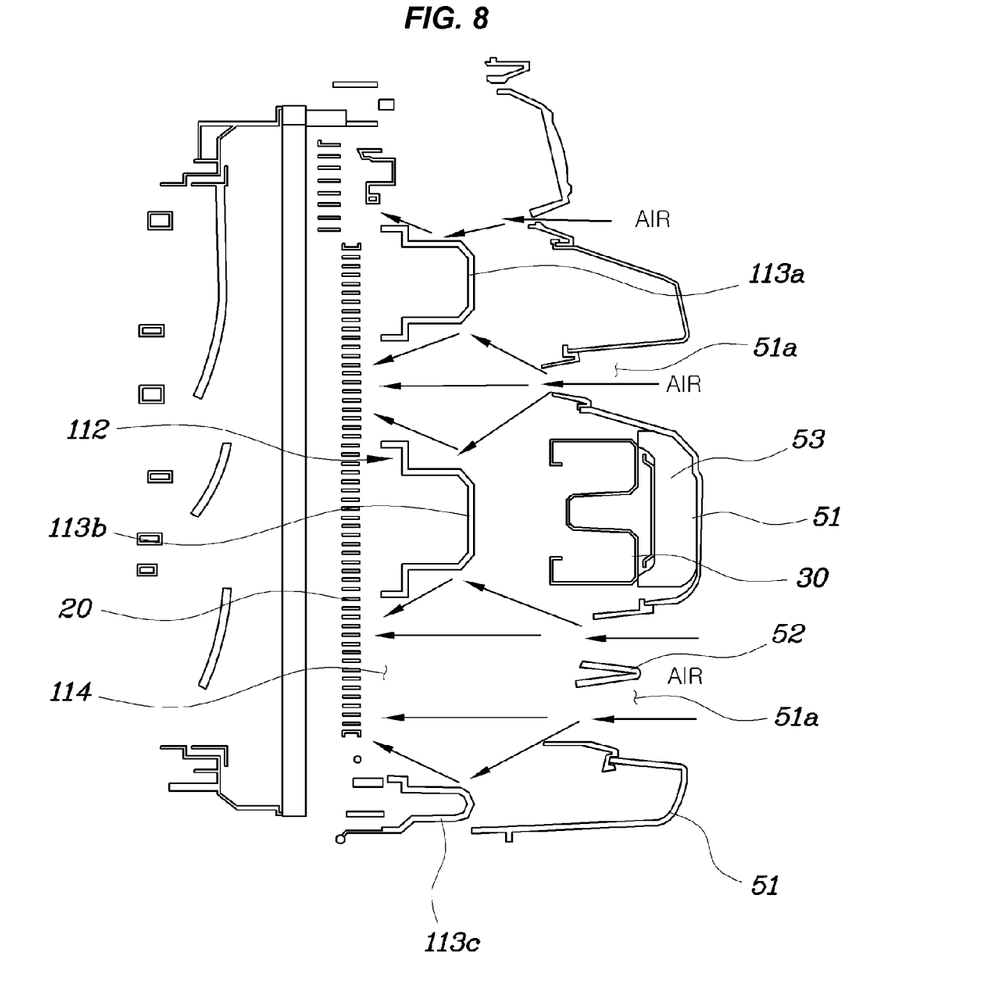
FIG. 8 is a sectional view taken along the line VIII-VIII of FIG. 7.

The plastic carrier 110 includes a quadrangular main frame 111 having an opening 114 in which a radiator is to be arranged, and a sub frame 112 which horizontally extends across the opening 114 and which is coplanar with main frame 111, as shown FIG. 5a and FIG. 8. Both ends of the sub frame 112 are connected to both side portions of the main frame 111. The strength of both side portions of the main frame 111 is reinforced by the sub frame 112, so that cracks, which otherwise occur in the conventional art, are prevented from being produced. The opening 114 is divided into upper and lower spaces by the sub frame 112.

Air guides 113a through 113e (collectively referenced by the numeral 113) are protrusively formed on the main frame 111 and the sub frame 112. The air guides 113 serve to guide the air introduced from the front part of a vehicle to smoothly direct it toward the radiator. The air guides 113 have shapes which project toward the front part of the vehicle.

The steel carrier 120 comprises a receiving opening 125 having a shape which matches that of the plastic carrier 110. That is to say, the steel carrier 120 has the receiving opening 125 which corresponds to the main frame 111 of the plastic carrier 110.

Figure 6:
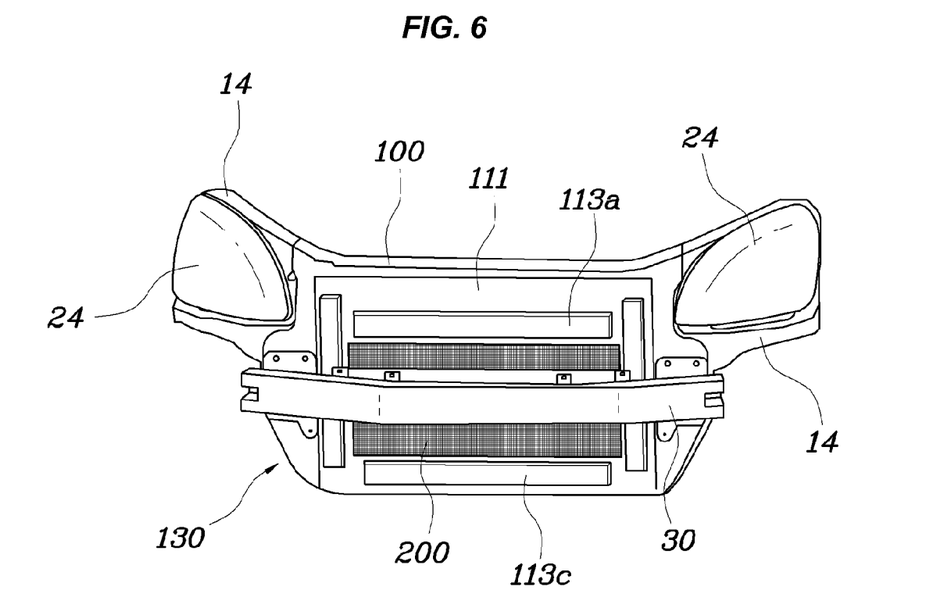
FIG. 6 is a view illustrating a front end module according to an exemplary embodiment of the present invention.
Figure 7:
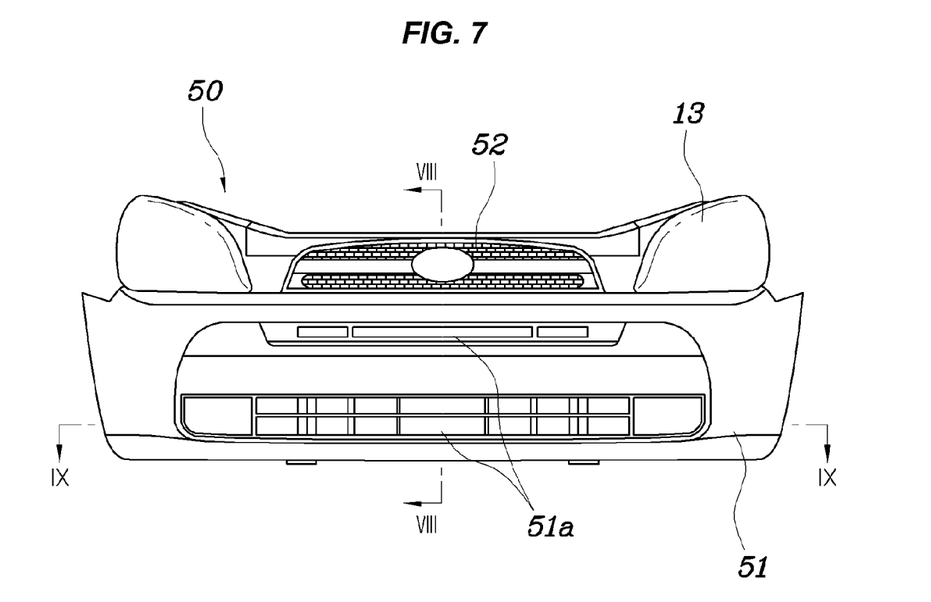
FIG. 7 is a view illustrating a front end module system together with a bumper cover assembly, according to an exemplary embodiment of the present invention.

FIG. 6 illustrates a front end module 130 in which head lamps 24, a bumper beam 30 and a radiator 20 are mounted to the above-described carrier 100. FIG. 7 illustrates a front end module system in which a bumper cover assembly 50 is installed on the front end module 130. The head lamps 24 are mounted to ear portions 14, which are formed on the upper portions of both sides of the carrier 100. The reference numeral 52 designates a bumper grill.

Figure 9:
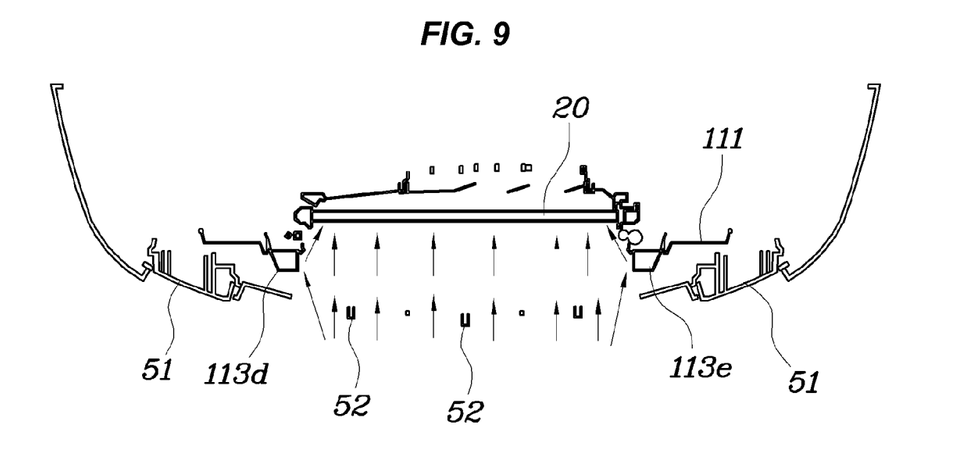
FIG. 9 is a sectional view taken along the line IX-IX of FIG. 7.

Hereafter, air flow through the carrier 100 or the front end module system described above will be explained with reference to FIGS. 7 through 9.

Observing the locations of the carrier 100 and the bumper cover assembly 50, which are mounted to the vehicle, as can be clearly seen from FIG. 8, the opening 114, which is divided into the upper and lower spaces by the sub frame 112 of the plastic carrier 110, faces and communicates with the air inlets 51a of a bumper cover 51. Due to these locations, the air introduced through the air inlets 51a can be directly supplied to the radiator 20 through the opening 114 of the carrier 100. The bumper beam 30 is disposed in front of the sub frame 112 of the plastic carrier 110.

A portion of the air introduced through the opening 114, which flows toward the main frame 111 or the sub frame 112 of the plastic carrier 110, is captured by the air guides 113 and is redirected toward the radiator 20 through the opening 114. The air guides 113 can be designed by analyzing air flow around the carrier 100 and applying various techniques known in the art, to have a configuration which can force the air flowing from the front part of the carrier 100 to be smoothly introduced into the opening 114.

As is apparent from the above description, the carrier and the front end module system according to an exemplary embodiment of the present invention confer advantages in that air can be smoothly introduced toward a radiator from the front part of a vehicle by air guides, whereby the cooling performance of a radiator can be improved.

Also, strength is increased at a junction area between a plastic carrier and a steel carrier by a sub frame which extends horizontally at the middle of a main frame, whereby it is possible to prevent cracks from occurring in the carrier in the event of a rear-end collision.

Although a preferred embodiment of the present invention has been described for illustrative purposes, those skilled in the art will appreciate that various modifications, additions and substitutions are possible, without departing from the scope and spirit of the invention as disclosed in the accompanying claims.

What is claimed is:

1. A front end module system comprising:
a bumper cover assembly having air inlets; and
a first carrier disposed behind the bumper cover and including:
a main frame which includes a horizontal upper member, a horizontal lower member, vertical left and right side members connecting the horizontal upper member with the horizontal lower member at both sides thereof and thus forming an opening to which a radiator is located;
at least a sub frame one end of which is connected to the left side member of the main frame and the other end of which is connected to the right side member of the main frame so as to horizontally divide the opening into at least a first opening formed upper side of the sub frame and a second opening formed lower side of the sub frame, a shape of vertical section of the sub frame is figured to project forward so as to let the air be guided to flow in the first opening or the second opening onto the radiator; and
a second carrier coupled to the first carrier and having a receiving opening wherein the main frame of the first carrier is assembled onto or around the receiving opening of the second carrier,
wherein the first carrier is made of plastic and the second carrier is made of steel and the first carrier and the second carrier are connected with each other in a body through an insert injection molding; and
wherein the sub frame is coplanar with the main frame.

2. The front end module system according to claim 1, wherein the bumper cover assembly includes a bumper beam, which is disposed at a same height with the sub frame, and in front of the sub frame.

3. A carrier for a front end module as a front structure of a vehicle, the carrier comprises:
a first carrier including:
a main frame which includes a horizontal upper member, a horizontal lower member, vertical left and right side members connecting the horizontal upper member with the horizontal lower member at both sides thereof and thus forming an opening to which a radiator is located;
at least a sub frame having one end connected to the left side member of the main frame and the other end connected to the right side member of the main frame so as to horizontally divide the opening into at least a first opening formed upper side of the sub frame and a second opening formed lower side of the sub frame, a shape of vertical section of the sub frame is figured to project forward so as to let the air be guided to flow in the first opening and/or or the second opening onto the radiator; and
a second carrier coupled to the first carrier and having a receiving opening wherein the main frame of the first carrier is assembled onto or around the receiving opening of the second carrier,
wherein the first carrier is made of plastic and the second carrier is made of steel and the first carrier and the second carrier are connected with each other in a body through an insert injection molding; and
wherein the sub frame is coplanar with the main frame.

4. The carrier according to claim 3, wherein the main frame is in a quadrangular shape.

5. The carrier according to claim 3, wherein a bumper cover assembly is disposed in front of the second carrier and coupled to the second carrier, and air inlets of the bumper cover assembly are formed at same heights with the first and the second openings so as to communicate with respective portions which is divided by the at least a sub frame the first and the second openings.

6. The carrier according to claim 5, wherein the bumper cover assembly includes a bumper beam, which is disposed at a same height of the sub frame in front of the sub frame and coupled to the second carrier.

7. The front end module system according to claim 1, wherein the main frame and the sub frame are made of plastic and are formed in a body.

8. The carrier according to claim 3, wherein the main frame and the sub frame are made of plastic and are formed in a body.

9. The carrier according to claim 1, wherein an air guide protrudes from both the at least a sub frame and the main frame toward the bumper cover.

* * * * *